US011551590B2

(12) United States Patent
Chou et al.

(10) Patent No.: US 11,551,590 B2
(45) Date of Patent: Jan. 10, 2023

(54) MESSAGING DISPLAY APPARATUS (71) Applicant: INNOVART DESIGN INC., City of Industry, CA (US)

(72) Inventors: Wei Cheng Chou, Azusa, CA (US); Chih-Hao Liu, Taipei (TW)

( * ) Notice: Subject to any disclaimer, the term of this patent is extended or adjusted under 35 U.S.C. 154(b) by 0 days.

(21) Appl. No.: 16/644,156

(22) PCT Filed: Sep. 3, 2018

(86) PCT No.: PCT/US2018/049299
§ 371 (c)(1),
(2) Date: Mar. 3, 2020

(87) PCT Pub. No.: WO2019/083613
PCT Pub. Date: May 2, 2019

(65) Prior Publication Data
US 2020/0215968 A1 Jul. 9, 2020

Related U.S. Application Data (60) Provisional application No. 62/553,855, filed on Sep. 3, 2017.

(51) Int. Cl.
| *B60Q 1/26* | (2006.01) |
| *G09F 21/04* | (2006.01) |
| *B60Q 1/50* | (2006.01) |
| *B60R 11/02* | (2006.01) |
| *B60R 16/03* | (2006.01) |
| *B60R 16/037* | (2006.01) |

(Continued)

(52) U.S. Cl.
CPC .............. *G09F 21/04* (2013.01); *B60Q 1/503* (2013.01); *B60R 11/0235* (2013.01); *B60R 16/03* (2013.01); *B60R 16/0373* (2013.01); *G09F 9/33* (2013.01); *B60R 2011/008* (2013.01); *B60R 2011/0026* (2013.01)

(58) Field of Classification Search
CPC ..... B60Q 1/503; B60R 11/0235; B60R 16/03; B60R 16/0373; B60R 2011/0026; B60R 2011/008; G09F 9/33; G09F 21/04
USPC ......................................................... 340/468
See application file for complete search history.

(56) References Cited

U.S. PATENT DOCUMENTS 5,132,876 A * 7/1992 Ma ........................ G06F 1/1616
361/679.09
5,519,377 A * 5/1996 Murphy ................. B60Q 9/006
340/904

(Continued)

*Primary Examiner* — Kerri L McNally
*Assistant Examiner* — Thang D Tran
(74) *Attorney, Agent, or Firm* — Che-Yang Chen; Law Office of Michael Chen (57) ABSTRACT A display apparatus configured to receive a command, and convert the command to displayable information to an outside pedestrian or drivers in other vehicles may include a main body that includes a securing portion to secure the display apparatus to a vehicle; a communication unit to receive the command; a processor to convert the command to displayable information; a display portion having a displaying layer to display information; and a power managing unit to store and provide electrical energy for the display apparatus. In one embodiment, the power managing unit may include a power generating unit to be positioned to overlap with the displaying layer.

12 Claims, 7 Drawing Sheets (51) Int. Cl.
*G09F 9/33* (2006.01)
*B60R 11/00* (2006.01)

(56) References Cited

U.S. PATENT DOCUMENTS

| | | | | |
|---|---|---|---|---|
| 6,211,038 B1* | 4/2001 | Nakagawa | H01L 21/76259 | 257/52 |
| 6,265,984 B1* | 7/2001 | Molinaroli | H05B 47/155 | 340/815.4 |
| 6,446,374 B1* | 9/2002 | Ardiff | G09F 3/20 | 40/591 |
| 6,731,435 B1* | 5/2004 | Kormos | G02B 26/0816 | 345/7 |
| 6,825,415 B1* | 11/2004 | Chen | F16M 11/10 | 248/65 |
| 8,638,280 B2* | 1/2014 | Nonaka | G11C 19/28 | 345/87 |
| 8,675,361 B1* | 3/2014 | Jivani | G06F 1/182 | 174/559 |
| 8,749,363 B2* | 6/2014 | Masuda | B60K 35/00 | 340/425.5 |
| 2002/0195490 A1* | 12/2002 | Gehlot | B60R 13/10 | 235/384 |
| 2004/0119824 A1* | 6/2004 | Osada | G09G 3/006 | 345/84 |
| 2005/0086843 A1* | 4/2005 | Buchanan | G09F 21/04 | 40/611.05 |
| 2006/0250383 A1* | 11/2006 | Chen | G06F 3/147 | 345/204 |
| 2007/0203641 A1* | 8/2007 | Diaz | G01C 21/3688 | 701/526 |
| 2008/0035736 A1* | 2/2008 | Tompkin | B42D 25/29 | 235/488 |
| 2008/0122780 A1* | 5/2008 | Ishibashi | G02F 1/13718 | 345/102 |
| 2009/0325458 A1* | 12/2009 | Liu | A63H 5/00 | 446/298 |
| 2010/0114679 A1* | 5/2010 | Pan | H02S 40/38 | 705/14.4 |
| 2010/0245731 A1* | 9/2010 | Limketkai | H01M 14/005 | 349/106 |
| 2011/0011435 A1* | 1/2011 | Hsu | H02S 20/26 | 136/244 |
| 2011/0062888 A1* | 3/2011 | Bondy | H05B 45/10 | 315/294 |
| 2012/0061029 A1* | 3/2012 | Weston | F24F 13/082 | 160/6 |
| 2013/0238441 A1* | 9/2013 | Panelli | G06Q 50/01 | 705/14.62 |
| 2014/0043156 A1* | 2/2014 | Howk, Jr. | B60Q 1/503 | 340/468 |
| 2014/0043797 A1* | 2/2014 | Sun | A47F 3/001 | 362/133 |
| 2014/0063045 A1* | 3/2014 | Chang | G09G 3/3208 | 345/592 |
| 2014/0192468 A1* | 7/2014 | Kotaka | G06F 1/1616 | 361/679.55 |
| 2014/0301108 A1* | 10/2014 | Mineura | G02B 6/0011 | 362/615 |
| 2014/0338237 A1* | 11/2014 | Chu | G09F 9/30 | 40/452 |
| 2015/0033603 A1* | 2/2015 | Siegel | G09F 21/048 | 40/559 |
| 2015/0043231 A1* | 2/2015 | Clark | B60Q 1/50 | 362/485 |
| 2016/0071655 A1* | 3/2016 | Li | H01L 31/1888 | 136/254 |
| 2016/0087116 A1* | 3/2016 | Chen | H01L 27/302 | 257/84 |
| 2016/0322025 A1* | 11/2016 | Zhou | G09G 3/34 | |
| 2017/0205655 A1* | 7/2017 | Li | H01L 27/1248 | |
| 2017/0358630 A1* | 12/2017 | Naijo | H01L 51/442 | |
| 2018/0053103 A1* | 2/2018 | Delgado | G06N 5/04 | |
| 2020/0320910 A1* | 10/2020 | Horibe | G06F 1/1647 | |
| 2021/0385431 A1* | 12/2021 | Ohyama | H04N 13/32 | |

* cited by examiner

MESSAGING DISPLAY APPARATUS

FIELD OF THE INVENTION

The present invention relates to a message display apparatus, and more particularly to a message display apparatus configured to send a visual message to an operator of a motor vehicle within a predetermined distance, and to further detect the facial and gesture information from the vehicle operator to improve traffic safety while driving.

BACKGROUND OF THE INVENTION

Improving vehicle safety has long been a subject of public concern. As the number of vehicles has increased, so has the number of accidents. Drivers have long used simple intervehicular communication devices for alerting other drivers of impending action or danger. When used properly, such devices as turn signal lights, brake lights and horns provide convenient, low complexity message transmitters that help to maintain highway safety. These devices have failed, however, to avert the causes and problems associated with some drivers' erratic and sometimes irrational reactions to others' driving practices or discourtesy. This problem, commonly termed "road rage," has become a growing concern as highways have become more and more crowded. The term "road rage" as used herein refers to the negative psychological reactions exhibited by drivers in a variety of driving circumstances. Particularly prevalent among these reactions are feelings of frustration, anger and helplessness.

The negative reactions associated with road rage can be combated by providing a way for the affected driver to exercise additional control over the driving environment. One way to provide additional control is to enhance the driver's ability to communicate with other drivers. In general, enhanced communication improves an individual's psychological state while driving. The ability to transmit such simple messages as "Please," "Thank you," and "I'm sorry" can boost the individual's sense of self-efficacy, personal control, optimism, and belonging.

Therefore, there remains a need for an apparatus to convey simple but psychologically beneficial messages from one vehicle to another, which would provide an overall improvement in road safety by reducing road rage through enhanced communication without significant distraction of either the sending or receiving drivers.

SUMMARY OF THE INVENTION

In one aspect, a display apparatus configured to receive a command, and convert the command to displayable information to an outside pedestrian or drivers in other vehicles may include a main body that includes a securing portion to secure the display apparatus to a vehicle; a communication unit to receive the command; a processor to convert the command to displayable information; a display portion having a displaying layer to display information; and a power managing unit to store and provide electrical energy for the display apparatus.

In one embodiment, power managing unit may include a power generating unit to be positioned to overlap with the displaying layer.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
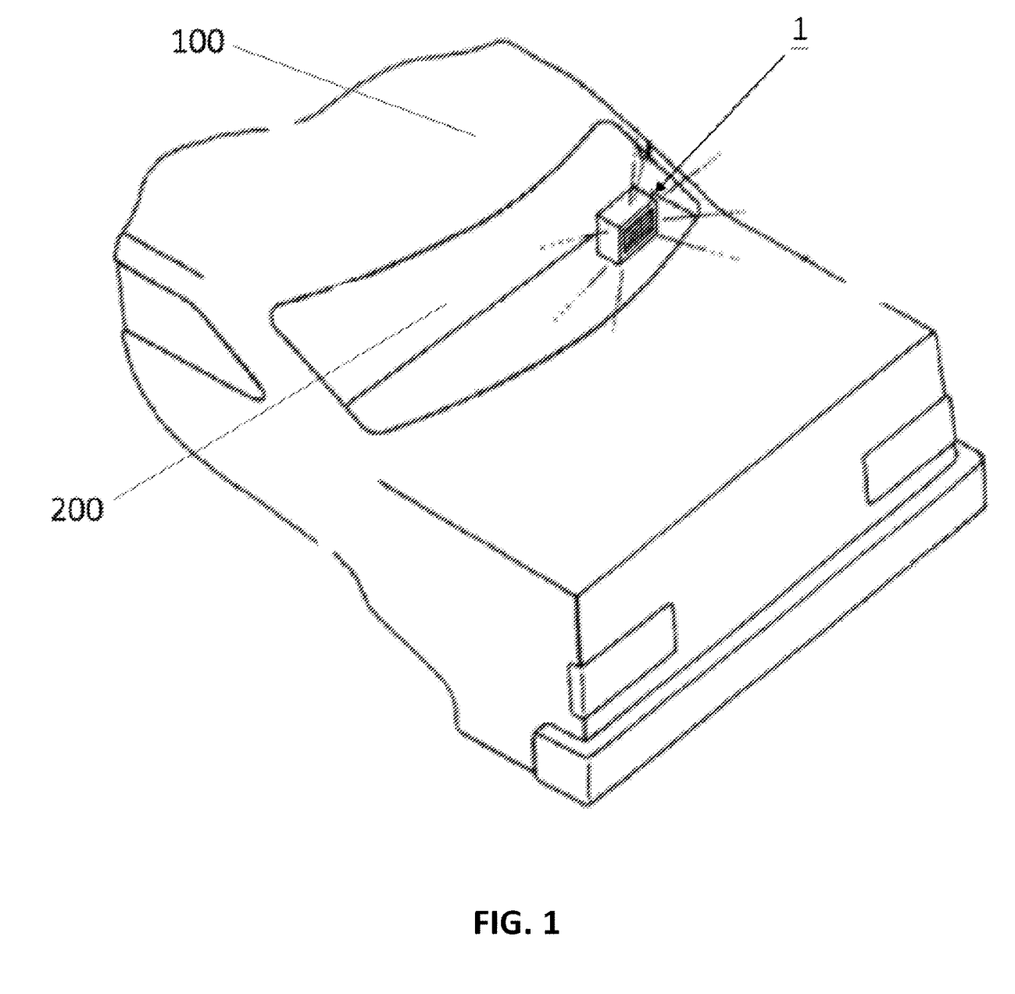
FIG. 1 is a schematic view of the message display apparatus used in a vehicle in the present invention.

Referring to FIG. 1, a message display apparatus 1 can be disposed in a vehicle 100. In one embodiment, the message display apparatus 1 can be attached to a rear windshield 200 of the vehicle to display a predetermined message to another vehicle or pedestrian outside. For example, the message can be shown to the vehicle behind to communicate with the driver therein. In another embodiment, the apparatus 1 can be powered by solar energy.

Figure 2:
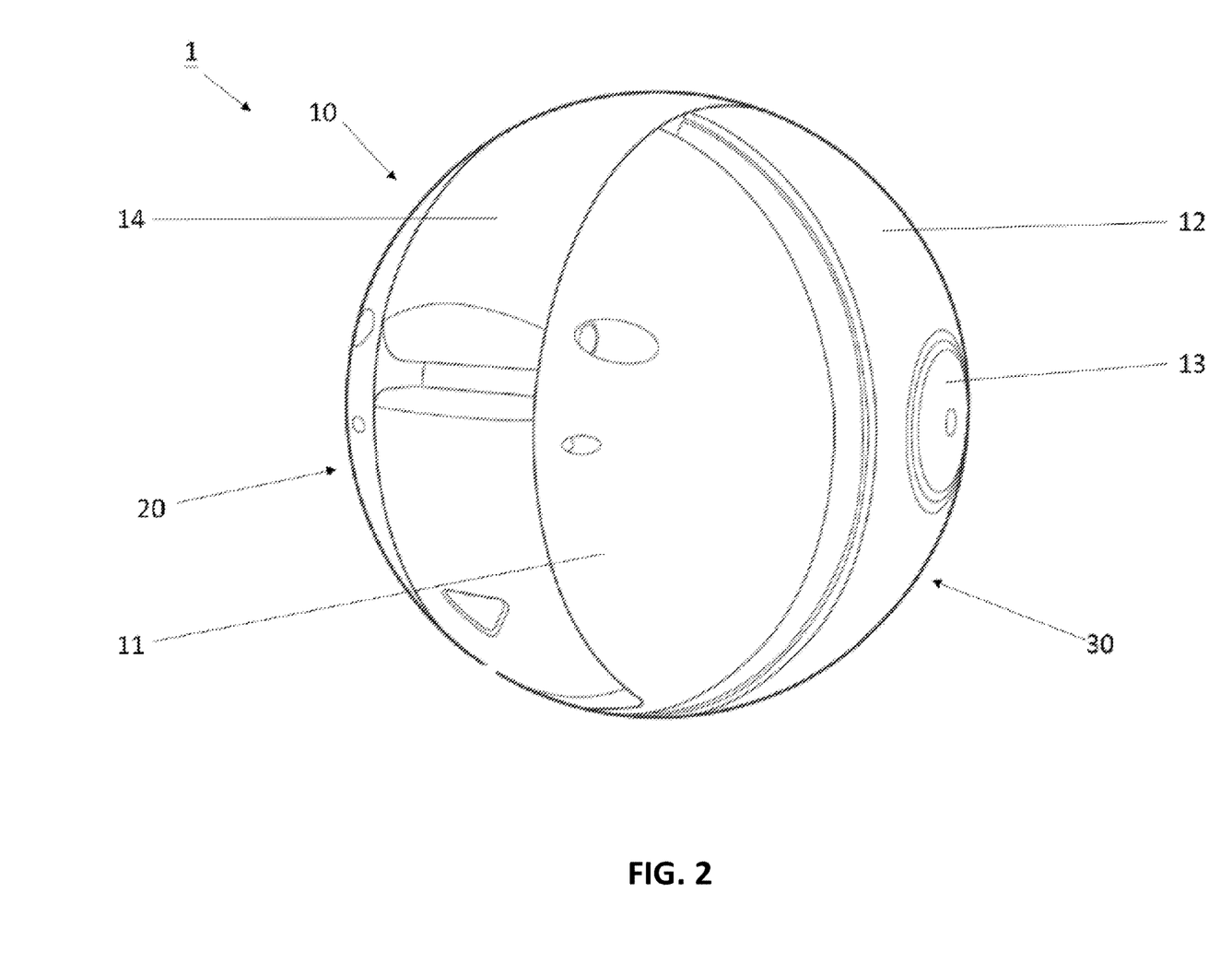
FIG. 2 is a perspective view of the message display apparatus in the present invention when it is folded.
Figure 3:
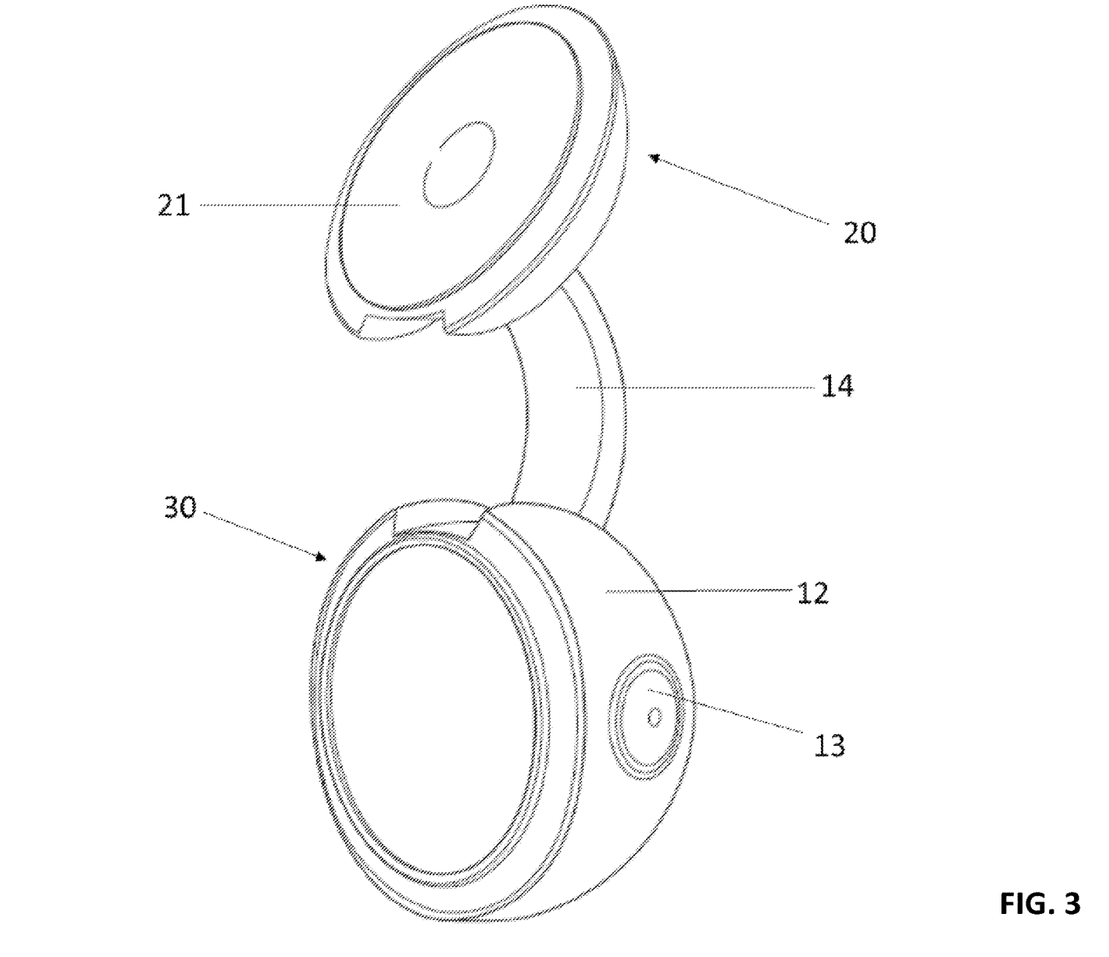
FIG. 3 is a perspective view of the message display apparatus in the present invention when it is unfolded to use.

In one aspect, referring to FIGS. 2 and 3, the message display apparatus 1 may include a main body 10, a connecting arm 14, a securing portion 20 and a display portion 30. The main body 10 has a top cover 11 on the securing portion 20 and a side cover 12 on the display unit 30. A connecting portion 15 is formed on both ends of the connecting arm 14 to connect with the top cover 11 and side cover 12 respectively, so that the message display apparatus can be folded to a ball-shaped unit as shown in FIG. 2 and unfolded as shown in FIG. 3 when in use.

In one embodiment, the securing portion 20 has a securing unit 21 that can be a circular suction disc, which can be attached to a front surface of the display portion 30 so the message display apparatus 1 can be folded as a ball-shaped unit as shown in FIG. 2. When the message display apparatus 1 is in use, the securing unit 21 is configured to attach to a surface that can be from 0 to 180 degrees from the display portion 30.

The message display apparatus 1 further includes a power managing unit 50 having a power generating unit 52. The message to display to the vehicle behind can be transmitted through the power generating unit 52. In other words, the power generating unit 52 has a certain extent of transparency for light transmission, and the user can adjust the angle between the securing unit 21 and the display portion 30 according to the user's preference to display messages.

Figure 4:
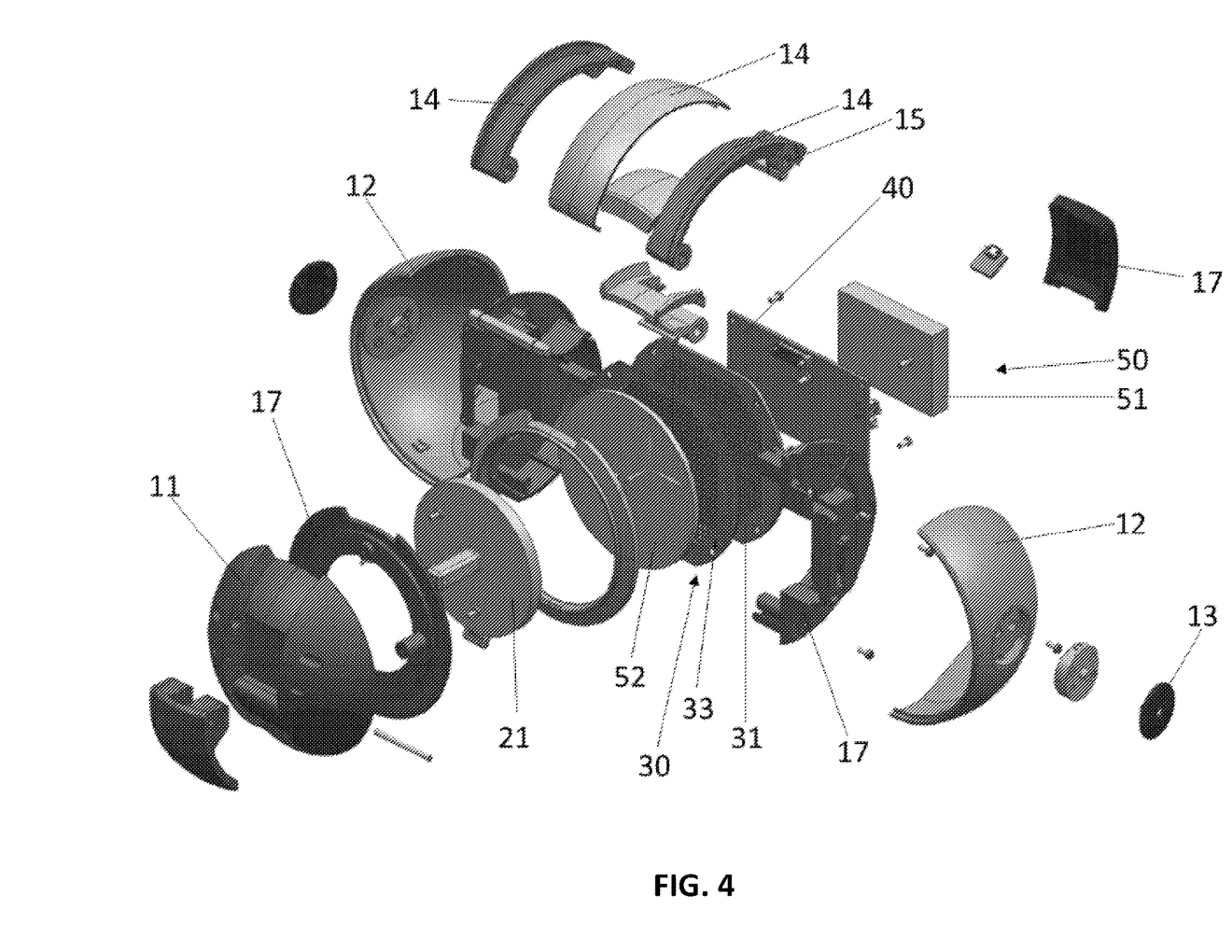
FIG. 4 is an exploded view of the message display apparatus in the present invention.

FIG. 4 is an exploded view for the message display apparatus in the present invention. As discussed above, the message display apparatus may include a top cover 11, a side cover 12, a connecting arm 14, a securing portion 20, a display portion 30, a control circuit board 40, a power managing unit 50, a power button 13 and an inner connecting unit 17. As shown in FIG. 4, the main components of the message display apparatus such as the securing portion 20, the display portion 30, the securing unit 21 and the power generating unit 52 are axially assembled. It is important to note that the power generating unit 52 is disposed along with the display portion 30. The display portion 30 is not only partially overlapped by the power generating unit 52, the power generating unit 52 entirely covers the display portion 30 that actually shows the message. When the message display apparatus is folded, the power generating unit 52 can be attached to the securing unit 21, and when the apparatus is in use, the power generating unit 52 faces the message receiving party and the light can pass through the power generating unit 52 to display message to others.

The control circuit board 40 is made of a "System on Chip" which includes a processor and a communication unit. The communication unit is configured to receive a command from the user inside the vehicle and transmit the command to the processor to generate a message displayed on the display portion 30. The message can be an expression (Emoji) 60, an animation or text.

It is noted that the securing portion 20 has the inner connecting unit 17 and the securing unit 21 that is substantially circular, and the securing unit 21 can be secured on the top cover 11 through the inner connecting unit 17. When the message display apparatus 1 is folded, the securing unit 21 attaches to the display portion 30, and the center of the securing unit 21 substantially overlapped with the center of the power generating unit 52.

Figure 5:
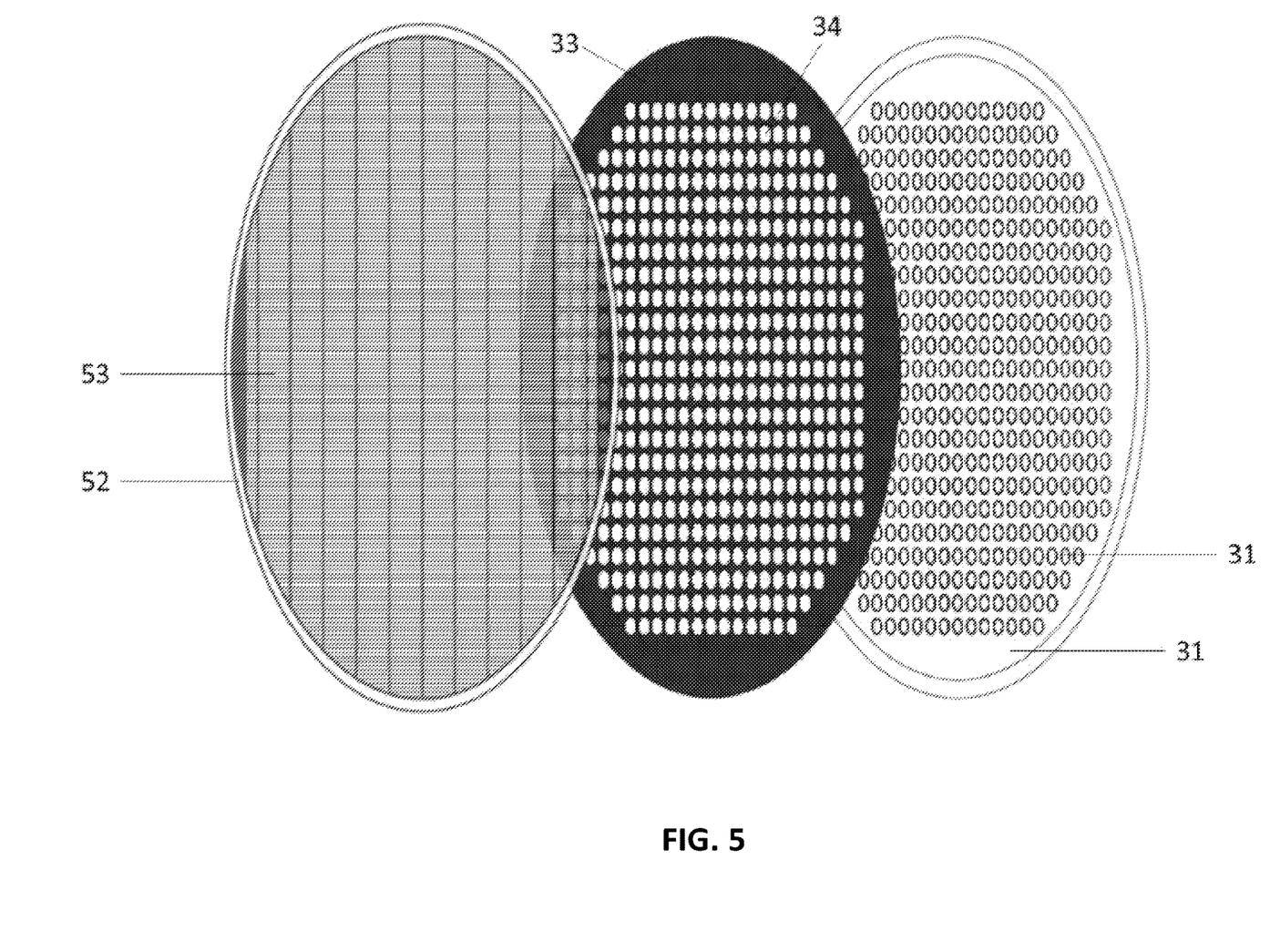
FIG. 5 is a schematic view of the displaying layer and the power generating unit in the present invention.

Referring to FIGS. 4 and 5, the display portion 30 may include a substantially circular LED (Light Emitting Diode) circuit board 31, an LED matrix 32 and a light guiding unit 33. In one embodiment, the LED matrix 32 is made by 23×23 RGB LED light bulbs disposed in front of the LED circuit board 31, electronically connected with the control circuit board 40, and powered by the power managing unit 50. The size of the light guiding unit 33 is substantially the same as the LED circuit board 31, and the light guiding unit 33 has a plurality of through holes 34 corresponding to the number of the light bulbs on the LED matrix 32. The light guiding unit 33 attaches to the LED circuit board 31, and the through holes 34 are configured to guide the light emitted by the LED light bulbs toward a predetermined direction. In one embodiment, the light is guided toward a direction perpendicular to the LED circuit board 31. In another embodiment, the LED matrix 32 can be replaced by LCD (Liquid Crystal Display) or OLED (Organic Light-Emitting Diode).

Still referring to FIGS. 4 and 5, the power managing unit 50 electronically connected with the control circuit board 40 may include a battery 51 and the power generating unit 52. In one embodiment, the battery can be a Lithium battery to power the message display apparatus 1. The power generating unit 52 can be a solar panel to connect to the battery 51. When the power generating unit 52 receives sunlight, the solar energy can be converted to electrical energy that can be stored in the battery 51. It is noted that the size and shape of the power generating unit 52 is similar to the light guiding unit 33 and LED circuit board 31, and the power generating unit 52 attaches to the light guiding unit 33. Also, the center of each of the LED circuit board 31, the light guiding unit 33 and the power generating unit 52 is approximately overlapped.

In a further embodiment, the power generating unit 52 is a thin-film solar panel with a certain degree of light transmittance so that the information shown by the LED matrix 32 can be transmitted through the power generating unit 52. The light transmittance rate is about 34% and to further improve the transmittance, the power generating unit 52 has a light transmitting portion 53 and the light emitted by the LED matrix 32 can completely pass through the light transmitting portion 53. As shown in FIG. 5, in one embodiment, the thin-film solar panel is further processed to form a plurality of elongated light transmitting portion 53, the area of which can be fifty percent (50%) of the thin-film solar panel, so the display effect can be enhanced without sacrificing power generating capabilities.

It is worth mentioning that the light transmitting portion 53 can also match the number of the through holes 34 on the LED matrix. In addition, if the LED matrix 32 is replaced by LCD or OLED display unit, the power generating unit 52 in the present invention can also be attached to the display portion thereof. Also, the area of the light transmitting portion 53 is inversely proportional to the lightness of the display portion. Namely, the lighter the display portion, the smaller the area of the light transmitting portion 53. It is noted that the light transmitting portion 53 is not a necessary portion since the power generating unit 52 has a certain extent of light transmittance as discussed above.

In a further embodiment, the message display apparatus 1 may further include a light detecting unit to detect the light intensity of the environment. The light detecting signal can be transmitted to the processor to control the lightness of the display portion 30. For example, when the light detecting unit detects a high light intensity from the vehicle behind, it can send a signal to the processor to simultaneously increase the light intensity of the display portion so that the driver in the vehicle behind can still see the information displayed on the apparatus 1.

Figure 6:
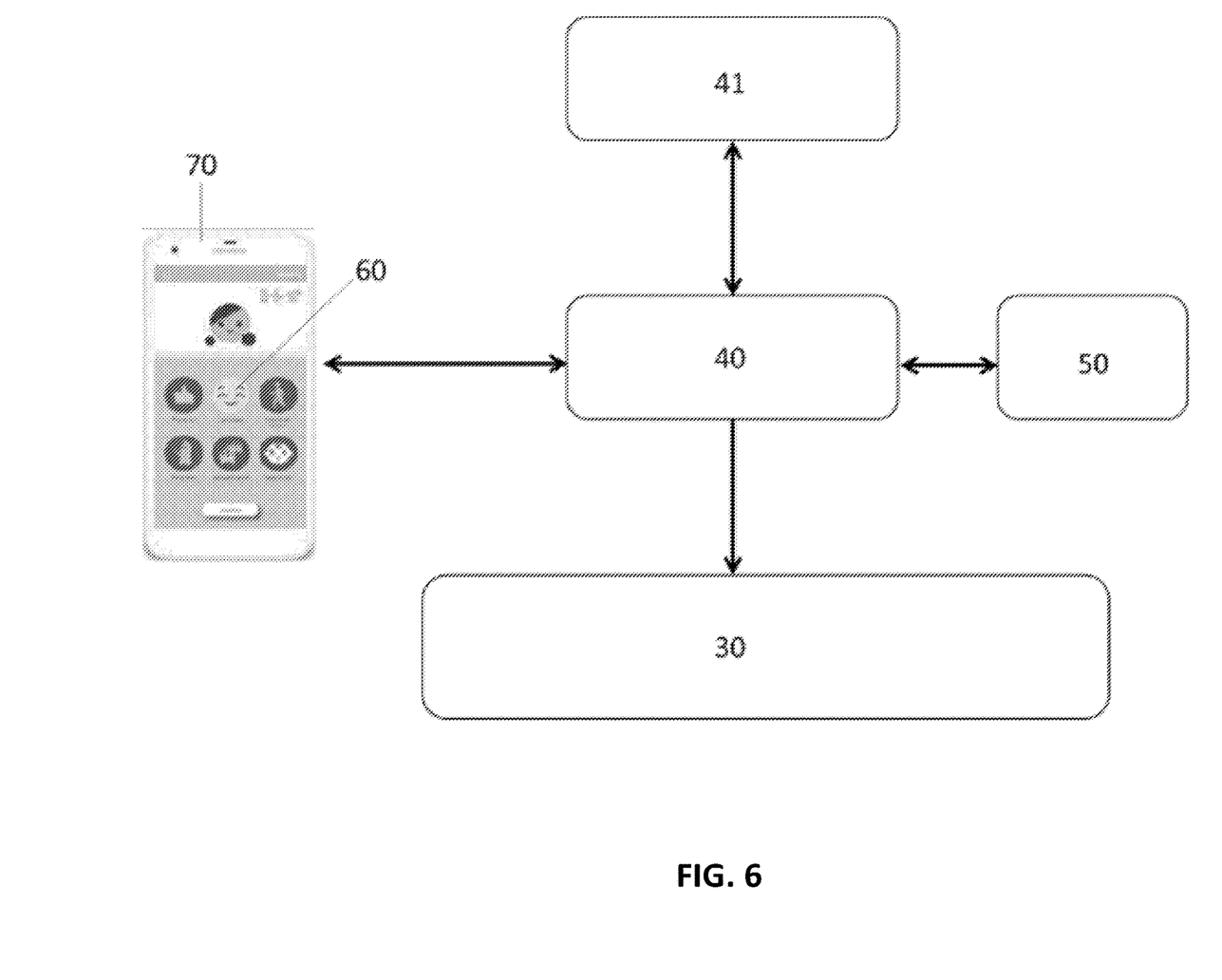
FIG. 6 illustrates a blog diagram of the message display apparatus in the present invention.

A block diagram of the present invention is shown in FIG. 6. As discussed above, the communication unit and the processor 40 and the power managing unit 50 are electronically connected. In one embodiment, the communication unit is a Bluetooth chip module that can be used to pair with a user's cellular phone 70 via Bluetooth 4.0 or other Bluetooth communication protocol. When the cellular phone 70 and the communication unit are paired, the user can control the message display apparatus by a voice command, a touch command, a facial expression or a hand gesture, and the command will be transmitted to the communication unit and then to the processor 40 to convert such command to a signal that can be transmitted to the display portion to show the corresponding message associated with the command.

In a further embodiment, the apparatus 1 can connect to the internet to conduct "Firmware Over-the-Air" (or FOTA) and through the internet connection, the apparatus can download more facial expression or animations, which can be stored in a memory device 41, such as an SD card.

In another embodiment, the driver can use a remote controller to control the message display apparatus 1. In still another embodiment, a control unit can be installed on or near the dashboard to wirelessly communicate with the message display apparatus 1 through wireless communication protocols, such as WIFI, Bluetooth, etc. The control unit may include some pre-set buttons for some commonly used terms such as "thank you," "sorry," "traffic ahead" . . . etc., so the driver can simply press the pre-set buttons to display certain terms to the vehicles behind.

In another aspect, the message display apparatus 1 may have a sensor to detect motor vehicles and/or other transportation means nearby. In one embodiment, the sensor can be a radar. In another embodiment, the sensor can be a sonar that can be used to detect the distance between the vehicle with other vehicles, as well as the velocity, acceleration, or direction of other vehicles.

In still another aspect, the message display apparatus 1 may be configured to conduct facial and/or gesture recognition. For example, the apparatus 1 can be used to recognize the facial/gesture of the driver behind the vehicle to further understand the mood and even the body condition of the driver behind the vehicle. Such information can be provided to the driver in the vehicle to make appropriate decision regarding safety whether to drive further away from the vehicle behind or even report to the police if the other driver's body condition is not proper to operate the vehicle. In one embodiment, the facial/gesture recognition can be done by video cameras. In another embodiment, it can be done through Infrared, X-ray devices or the like.

In a further aspect, the apparatus 1 can be used to communicate with a mobile device through an application software ("APP"). The driver in the vehicle can communicate with other drivers about the traffic, mood, etc. with other drivers. If the traffic is bad near vehicle, the driver can remind others drivers not to enter this specific area. The apparatus 1 can also obtain the data including traffic, driver's mood, body condition, etc. from the mobile device and further use such data to develop a solution to the driver through machine learning or deep learning techniques. It is noted that the data transmission can be two ways, namely the apparatus 1 can also transmit data to the mobile device that may be connected to home devices. In other words, it can be an ecosystem, which may include a mobile phone, AI (Artificial Intelligence) technology (algorithm, machine learning, deep learning) and/or IoT (Internet of Thing) techniques, the App on the mobile phone, a cloud and the message display apparatus 1.

Figure 7:
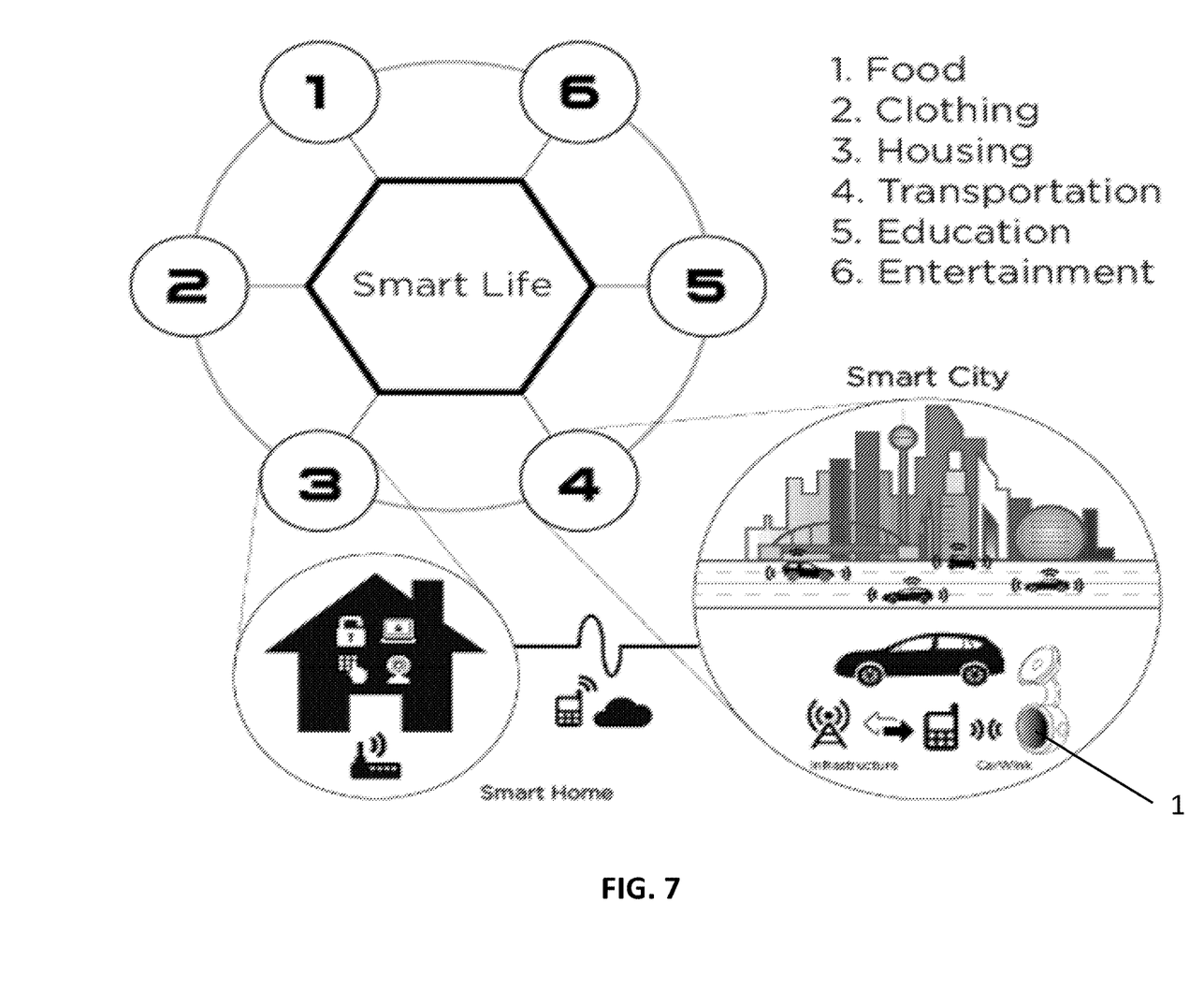
FIG. 7 is a schematic view of an ecosystem incorporating the message display apparatus in the present invention.

More specifically, as shown in FIG. 7, through the ecosystem, the user can bring the user experience at home into the vehicle, and the apparatus 1 can be connected to a computer in the vehicle or to a robot therein. Also, the information of user experience, traffic information, user behaviour, driving time, etc. can be collected and sent to the cloud through the mobile device, or saved in the mobile phone and transmitted to another connected system at home to achieve the goal of "smart home, smart city, smart life."

In one embodiment, an IoT box can be used when the user with the mobile device is away from the vehicle. The IoT box may have the capability for 4G/5G connection along with Bluetooth or other communication protocol to communicate with the apparatus 1. The apparatus 1 can also be used to recognize nearby vehicles through cameras or Li-DAR through the vehicle's brand, model, license plate number, etc. along with GPS to obtain the vehicle's position. It is important to note that the Emoji shown on the display portion can be projected to the windshield or to the rear mirrors.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A display apparatus configured to receive a command, and convert the command to displayable information to an outside pedestrian or drivers in other vehicles comprising:
   a main body that includes a securing portion to secure the display apparatus to a vehicle;
   a communication unit to receive the command;
   a processor to convert the command to displayable information; a display portion having a displaying layer to display information; and
   a power managing unit to store and provide electrical energy for the display apparatus; said power managing unit having a power generating unit to be positioned to overlap with the displaying layer,
   wherein the display portion and the power generating unit is secured between two semi-circular lateral connecting units and one circular axial connecting unit.

2. The display apparatus of claim 1, wherein the power generating unit is a solar panel having a light transmitting portion, and the solar panel is positioned to overlap with the displaying layer, and the light emitted from the displaying layer passes through the light transmitting portion.

3. The display apparatus of claim 2, wherein an area of the light transmitting portion is inversely proportional to the lightness of the displaying layer.

4. The display apparatus of claim 2, wherein the size of the light transmitting portion is about half of the solar panel.

5. The display apparatus of claim 2, the display portion further includes an LED matrix having a plurality of LED light bulbs and a light guiding unit having a plurality of through holes corresponding to the number of the LED light bulbs.

6. The display apparatus of claim 2, wherein the light transmitting portion has a plurality of elongated slits.

7. The display apparatus of claim 5, wherein the light guiding unit is disposed between the displaying layer and the power generating unit.

8. The display apparatus of claim 1, wherein the command is a voice command.

9. The display apparatus of claim 1, wherein the securing portion has a securing unit that can be attached to a windshield of the vehicle when the display apparatus is in use, and attached to the display portion when the display apparatus is folded.

10. The display apparatus of claim 1, further comprising a light detecting unit to detect light intensity of the environment to further adjust the lightness of the displaying layer.

11. The display apparatus of claim 1, wherein the power generating unit is completely overlapped with the displaying layer.

12. The display apparatus of claim 1, wherein the display apparatus is incorporated into an ecosystem that further includes a mobile phone, deep learning and/or IoT (Internet of Thing) techniques, an App on the mobile phone and a cloud, so that the display apparatus is configured to collect information such as user experience, traffic information, user behaviour, driving time, etc. and send to the cloud through the mobile device, or saved in the mobile phone and transmitted to another connected system at home to achieve the goal of "smart home, smart city, smart life".

* * * * *